Dec. 9, 1924.

C. H. HOWARD 1,518,513

MACHINE FOR APPLYING REENFORCING FILAMENTS TO FABRICS

Filed Aug. 30, 1922     9 Sheets—Sheet 1

Inventor:
Charles H. Howard
by Robt. P. Haine
Attorney

Dec. 9, 1924.

C. H. HOWARD 1,518,513

MACHINE FOR APPLYING REENFORCING FILAMENTS TO FABRICS

Filed Aug. 30, 1922

Inventor:
Charles H. Howard
by Robt. P. Hains
Attorney

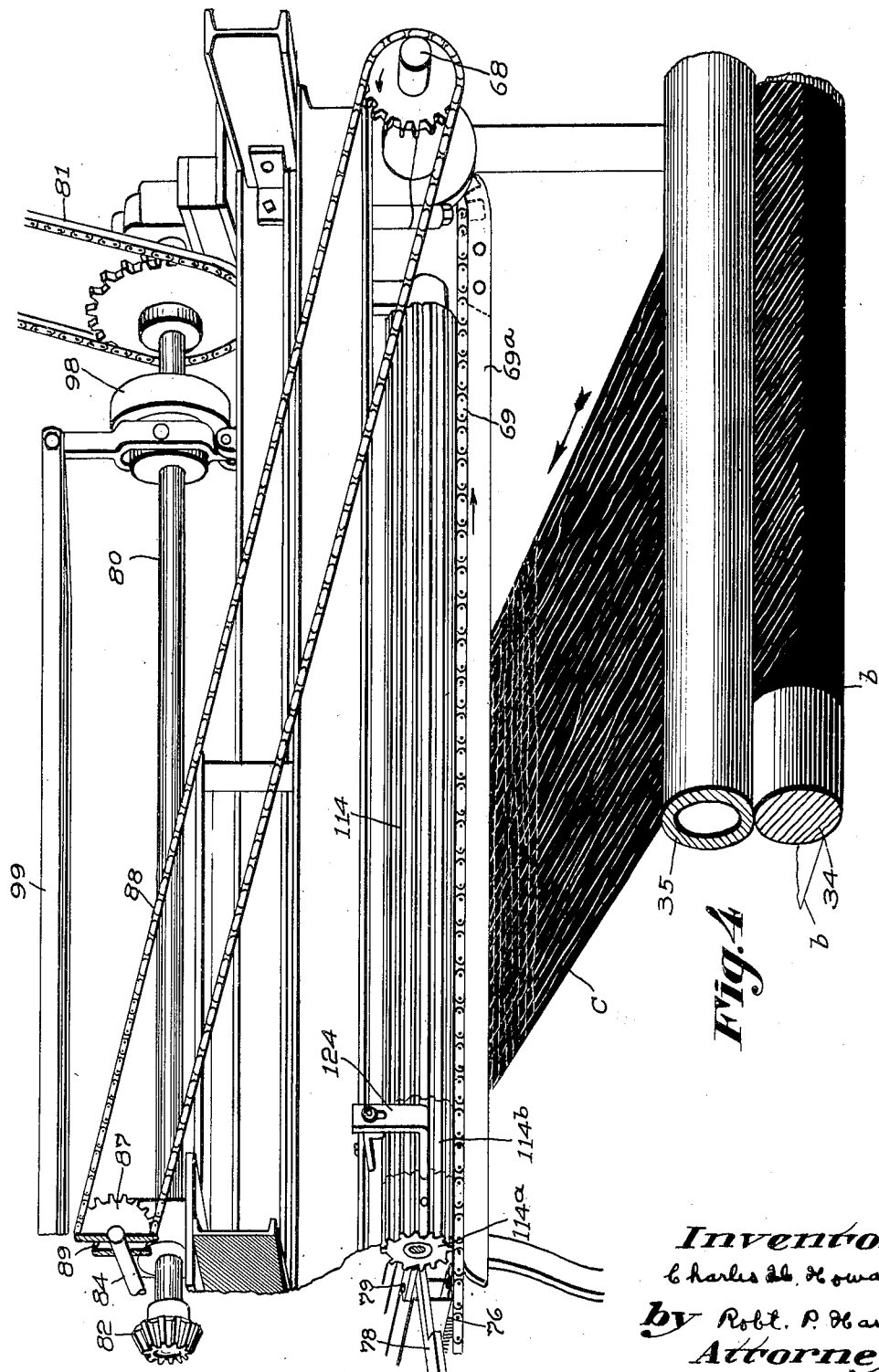

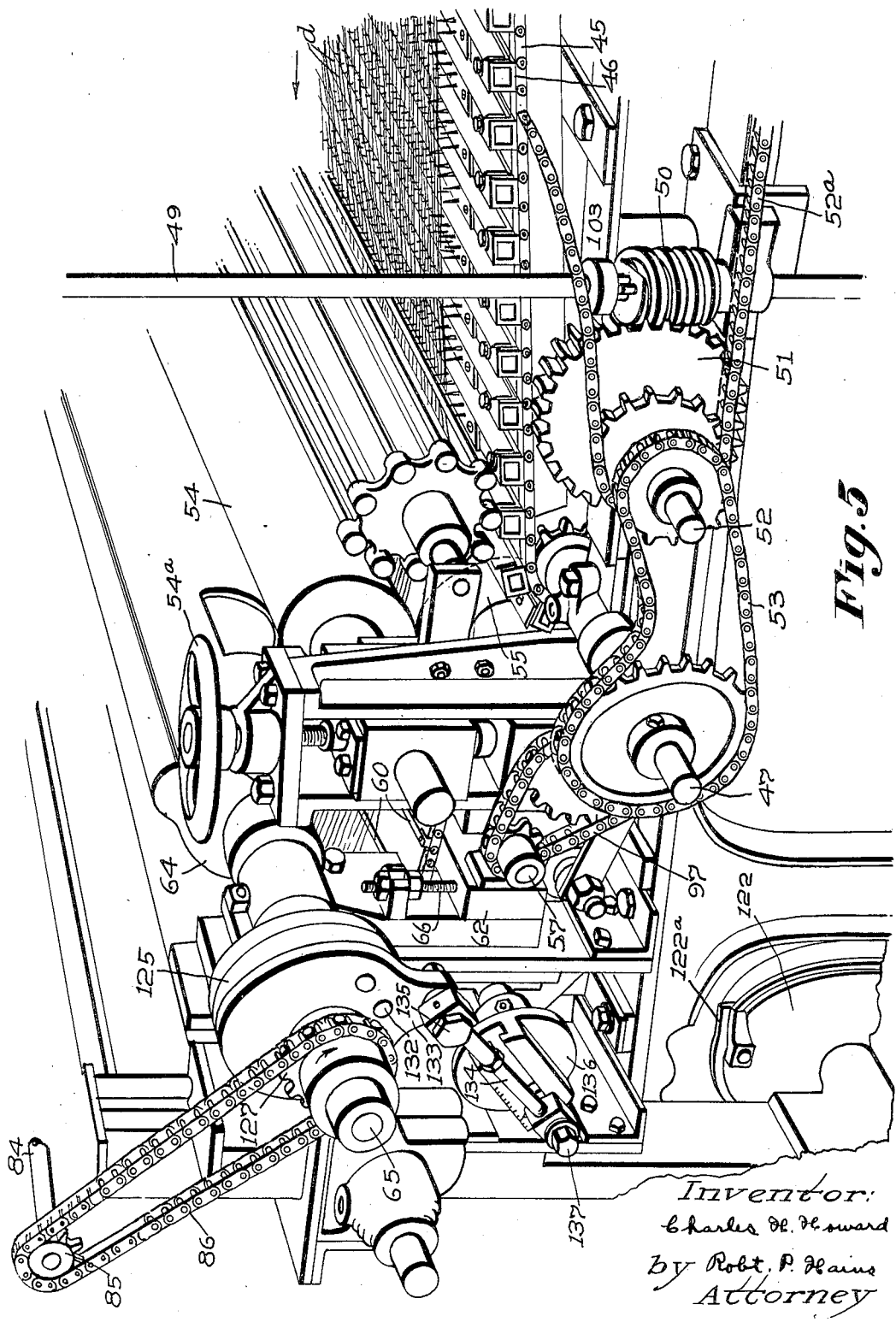

Dec. 9, 1924.
C. H. HOWARD
1,518,513
MACHINE FOR APPLYING REENFORCING FILAMENTS TO FABRICS
Filed Aug. 30, 1922   9 Sheets-Sheet 6
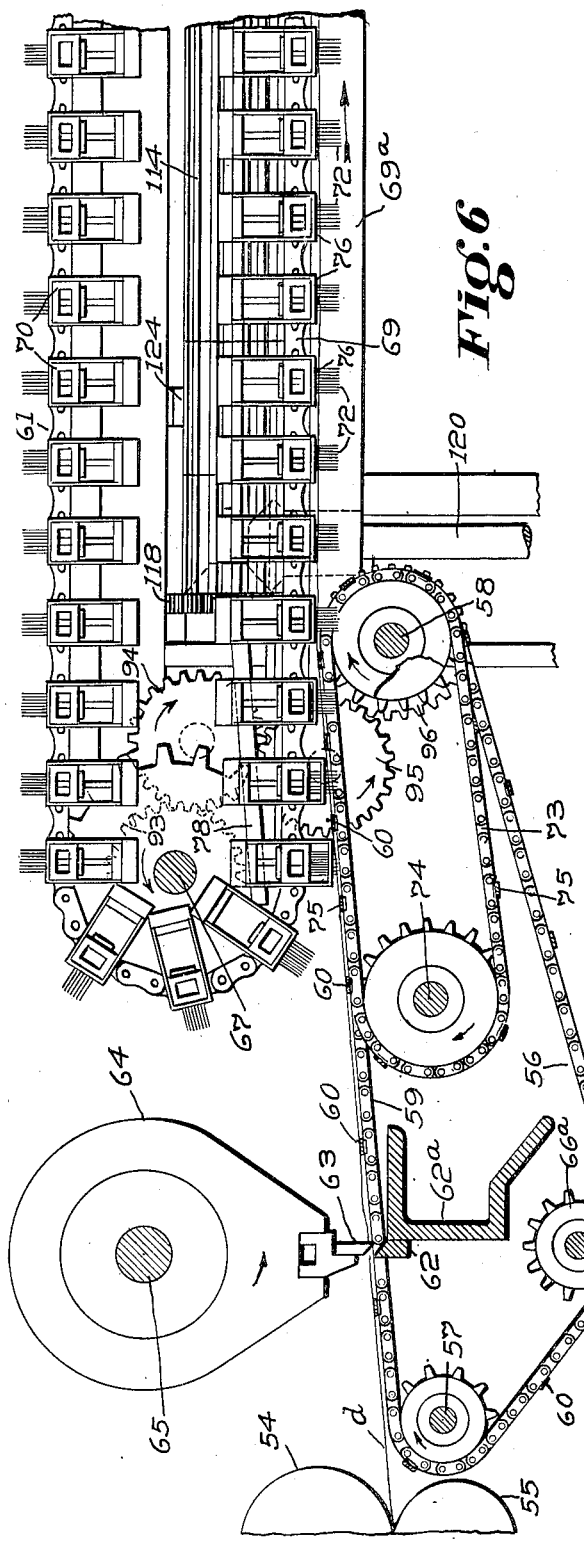
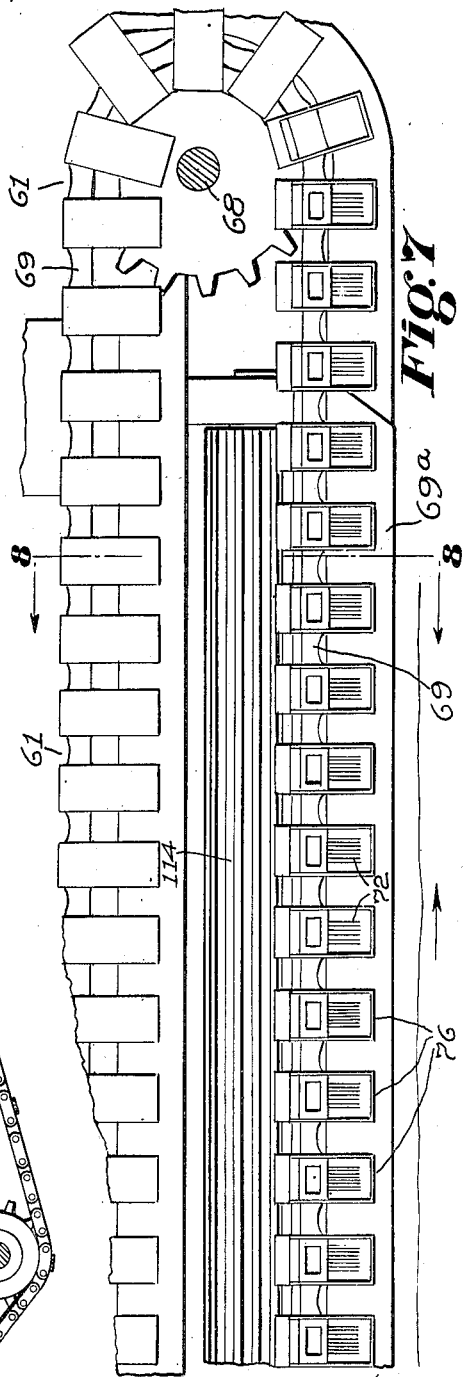
Inventor:
Charles H. Howard
by Robt. P. Hains
Attorney INVENTOR:
Charles H. Howard
BY Robt. P. Hains
ATTORNEY Dec. 9, 1924.
C. H. HOWARD
1,518,513
MACHINE FOR APPLYING REENFORCING FILAMENTS TO FABRICS
Filed Aug. 30, 1922   9 Sheets-Sheet 8
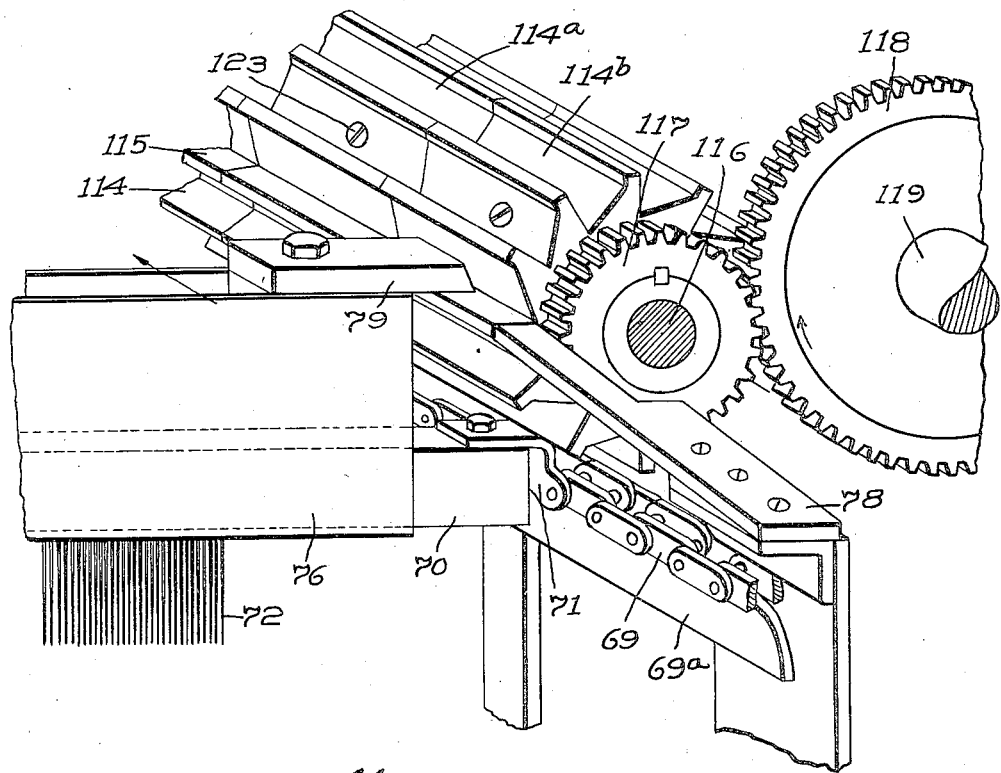
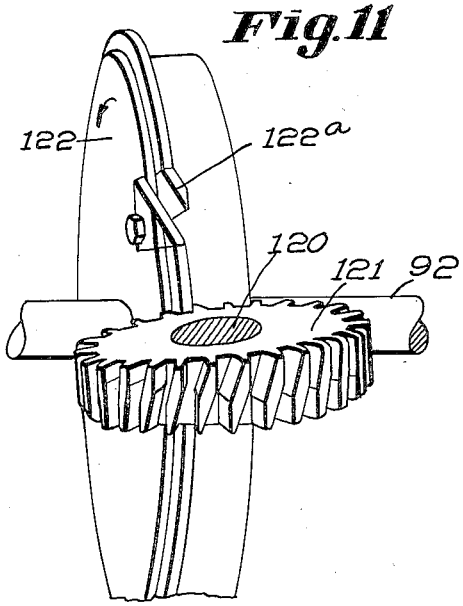
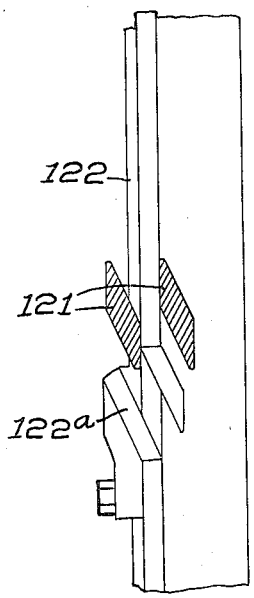
INVENTOR:
Charles H. Howard
BY
Robt. P. Haines
ATTORNEY Dec. 9, 1924.
C. H. HOWARD
1,518,513
MACHINE FOR APPLYING REENFORCING FILAMENTS TO FABRICS
Filed Aug. 30, 1922     9 Sheets-Sheet 9
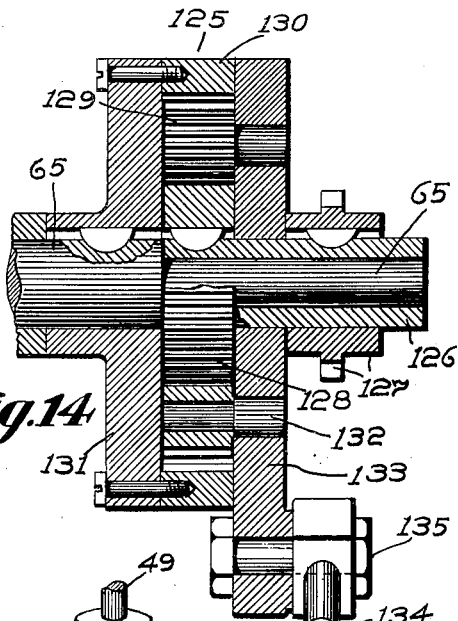
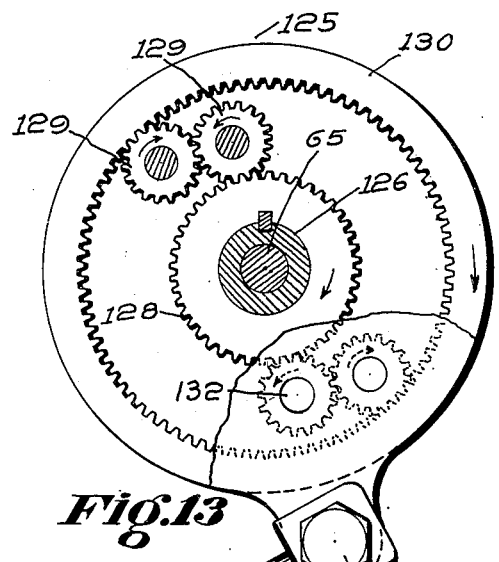
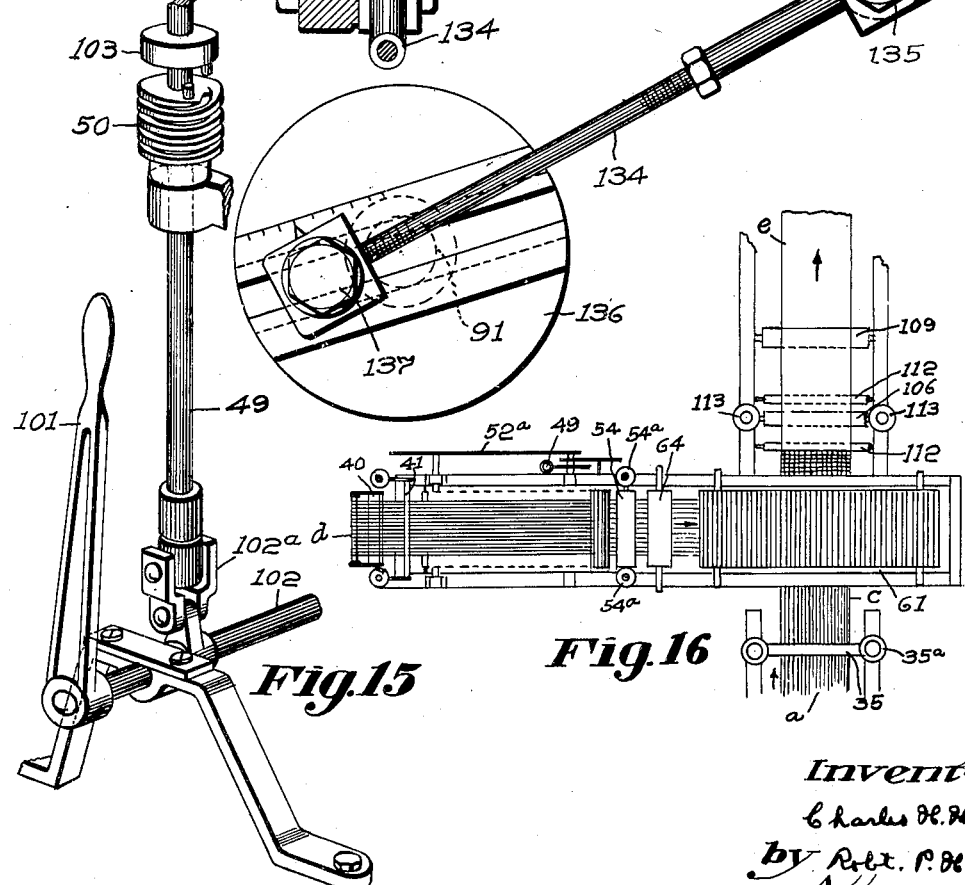
Inventor:
Charles H. Howard
by Robt. P. Hains
Attorney Patented Dec. 9, 1924.

1,518,513

UNITED STATES PATENT OFFICE.

CHARLES H. HOWARD, OF SAUGUS, MASSACHUSETTS, ASSIGNOR TO PAPER PRODUCTS MACHINE COMPANY, OF BOSTON, MASSACHUSETTS, A CORPORATION OF MASSACHUSETTS.

MACHINE FOR APPLYING REENFORCING FILAMENTS TO FABRICS.

Application filed August 30, 1922. Serial No. 585,259.

*To all whom it may concern:*

Be it known that I, CHARLES H. HOWARD, a citizen of the United States, and a resident of Saugus, county of Essex, and State of Massachusetts, have invented an Improvement in Machines for Applying Reenforcing Filaments to Fabrics, of which the following description, in connection with the accompanying drawings, is a specification, like characters on the drawings representing like parts.

This invention relates to machines for reenforcing fabrics by filaments, and more particularly to machines for applying reenforcing filaments transversely of the fabric.

The reenforcing filaments may be of any desired character which will impart the necessary or desired strength to the paper fabrics when combined therewith, but inasmuch as unspun fibres, such for instance as hemp, sisal, flax, ramie and the like, possess certain advantages over the other forms of reenforcing filaments such as cords, threads, and the like, the machine of the present invention will be described in connection with the application of unspun fibres to the fabric, it being understood however, that the invention is not necessarily restricted thereto, but that the invention may be used to apply other forms of reenforcing filaments to the fabric.

The unspun fibres are usually prepared in roving or sliver form. That is, the fibres are reclaimed from the woody material which naturally adheres to them, or other undesirable foreign substance, and are then formed into long untwisted ropings, rovings or slivers. The term "roving" will hereinafter be used to designate these untwisted ropings of fibres, and although the present invention is well adapted to apply reenforcing filaments of either long or relatively short fibre to paper fabric, the embodiment of the invention illustrated is designed to handle reenforcing filaments or fibres of long staple.

The fibres as presented in the rovings cannot be applied directly to the fabric to be reinforced but should be spread out and drawn until they form an economically thin sheet having the fibres thereof lying in substantially parallel relation.

To insure the presentation of the reenforcing fibres to the fabric in the desired thin condition, rovings formed of the fibres may be advanced side by side toward means that flattens the rovings out into a sheet-like form, and then the sheet of fibres may be combed and attenuated until the fibres lie in substantially parallel relation, and form a sheet having a thickness approximately equal to the thickness of a single fibre as more fully set forth in the copending application Serial No. 391,433 filed June 24, 1920.

In many cases it may be desirable to produce a paper fabric that is reinforced by filaments both longitudinally and transversely. The machine of the present invention is therefore adapted to apply one sheet of reenforcing filaments lengthwise of a sheet of paper, and to cut a second sheet of filaments into sections and successively apply the filaments of the sections transversely of the sheet of paper.

It is comparatively easy to apply reenforcing filament longitudinally of a sheet of paper as the paper is advanced in the direction of its length, but it is considerably more difficult to apply reenforcing filaments transversely of a sheet of paper as the paper travels in the direction of its length.

One important feature of the present invention, therefore, resides in means for cutting a sheet of substantially parallel filaments into sections and for applying the sections of filaments successively to a traveling sheet of paper with the filaments extending transversely of the paper sheet.

In accordance with the present invention, the reenforcing filaments that are applied transversely of a sheet of paper are cut to a length substantially equal to the width of the paper before they are applied thereto, and when it is desired to reinforce paper having a greater or less width than the paper upon which the machine previously worked, it is necessary to change the operation of the filament severing mechanism so that it will cut the transversely reenforcing filaments to a different length. It is not only important that the severing means cut the filaments to the desired length, but it is also important that the severing means be moved in the direction in which the filaments travel and at the same speed as the filaments during the interval of time that the severing means engage the filaments.

Another important feature of the invention therefore resides in a rotary cutter having means adjustable to vary the speed at which the cutter rotates during the interval of time that it engages the filaments.

In the present construction an endless carrier provided with comb teeth serves to carry the transversely reenforcing filaments to a position above the sheet of paper to which they are to be applied, and doffing means is provided for transferring the filaments from the teeth of the carrier to the paper.

Another important feature of the invention, therefore, resides in doffing bars and operating means therefor, and also in means adapted to vary the number of bars that will be doffed in a group to apply the reenforcing filaments transversely of the paper.

The endless carrier employed to carry the transverse, reenforcing filaments to a position above the paper to be reinforced is provided with teeth adapted to be inserted between the reenforcing filaments to hold the filaments, and as the comb teeth of the endless carrier travel from one run of the carrier to the other they swing through an arc of a circle with the result that the teeth that are passing from one run to the other move angularly relative to the teeth that have reached either run.

It is desirable that the teeth should not engage the reenforcing filaments until they have completed their travel from one run to the other, and another feature of the invention, therefore, resides in means for directing the transverse reenforcing filaments toward a run of the endless carrier so that the teeth will not engage the filaments until the former have completely reached the lower run of the carrier.

Other features of the invention and novel combination of parts in addition to the above will be hereinafter described in connection with the accompanying drawings which illustrate one good practical form thereof.

In the drawings:—

Fig. 4 is a perspective view of a continuation of the machine shown in Fig. 2.

Fig. 5 is a perspective view of the opposite side of a portion of the machine shown in Fig. 3.

Fig. 6 is a side view with parts in section of means for severing the transverse reenforcing filaments and for advancing them toward the position in which they are applied transversely of the fabric.

Fig. 7 is an enlarged view of part of the endless carrier of Fig. 6.

Fig. 10 is an enlarged perspective view of parts shown in Fig. 8.

Fig. 11 is an enlarged perspective view of gears shown in Fig. 8.

Fig. 12 is a different view of parts shown in Fig. 11.

Fig. 13 is a side view of gear mechanism for momentarily varying the speed of travel of the cutter that severs the transverse filaments.

Fig. 14 is a sectional view through the mechanism of Fig. 13.

Fig. 15 is a perspective view of clutch operating mechanism; and

Figure 1:
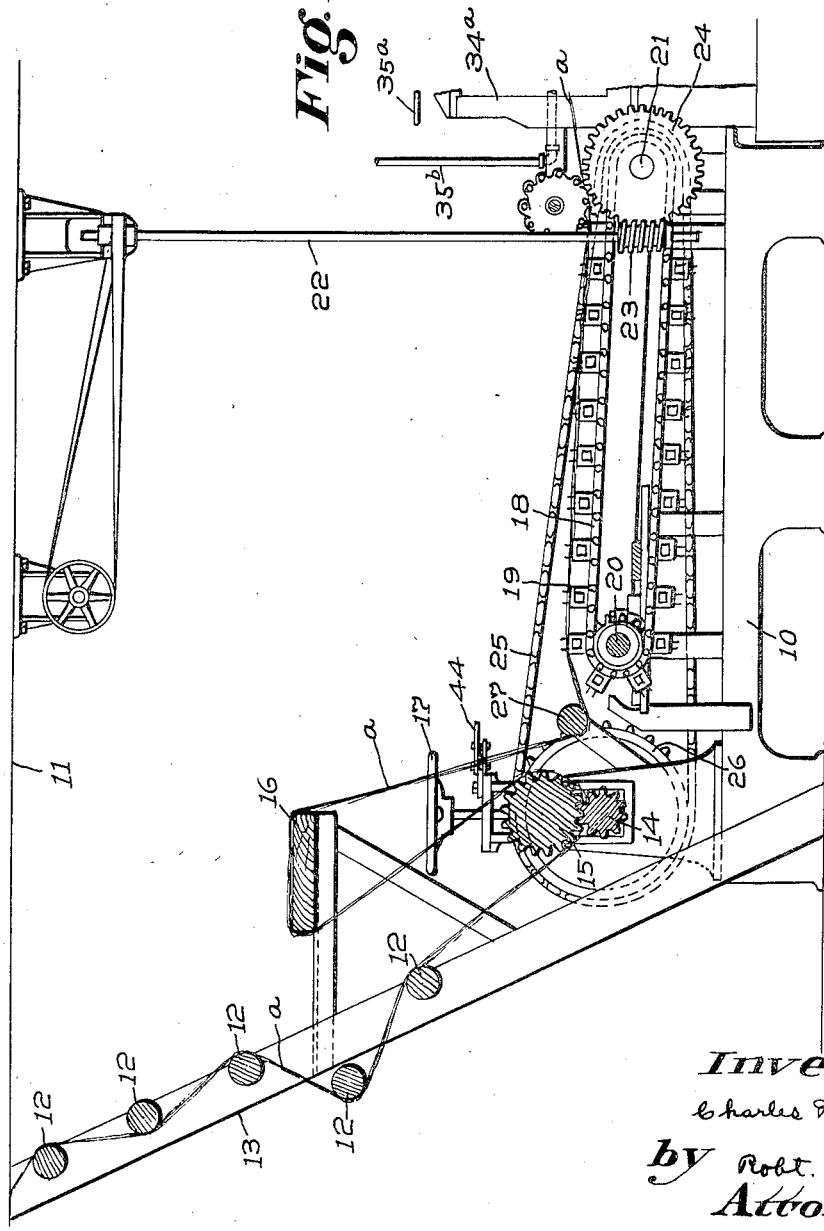
Fig. 1 is a side view with parts in section of a machine for advancing longitudinal reenforcing fibres toward the position in which they are applied to a fabric.

Fig. 16, on a much reduced scale, is a plan view of the entire machine with the exception of the portion thereof shown in Fig. 1.

Figure 2:
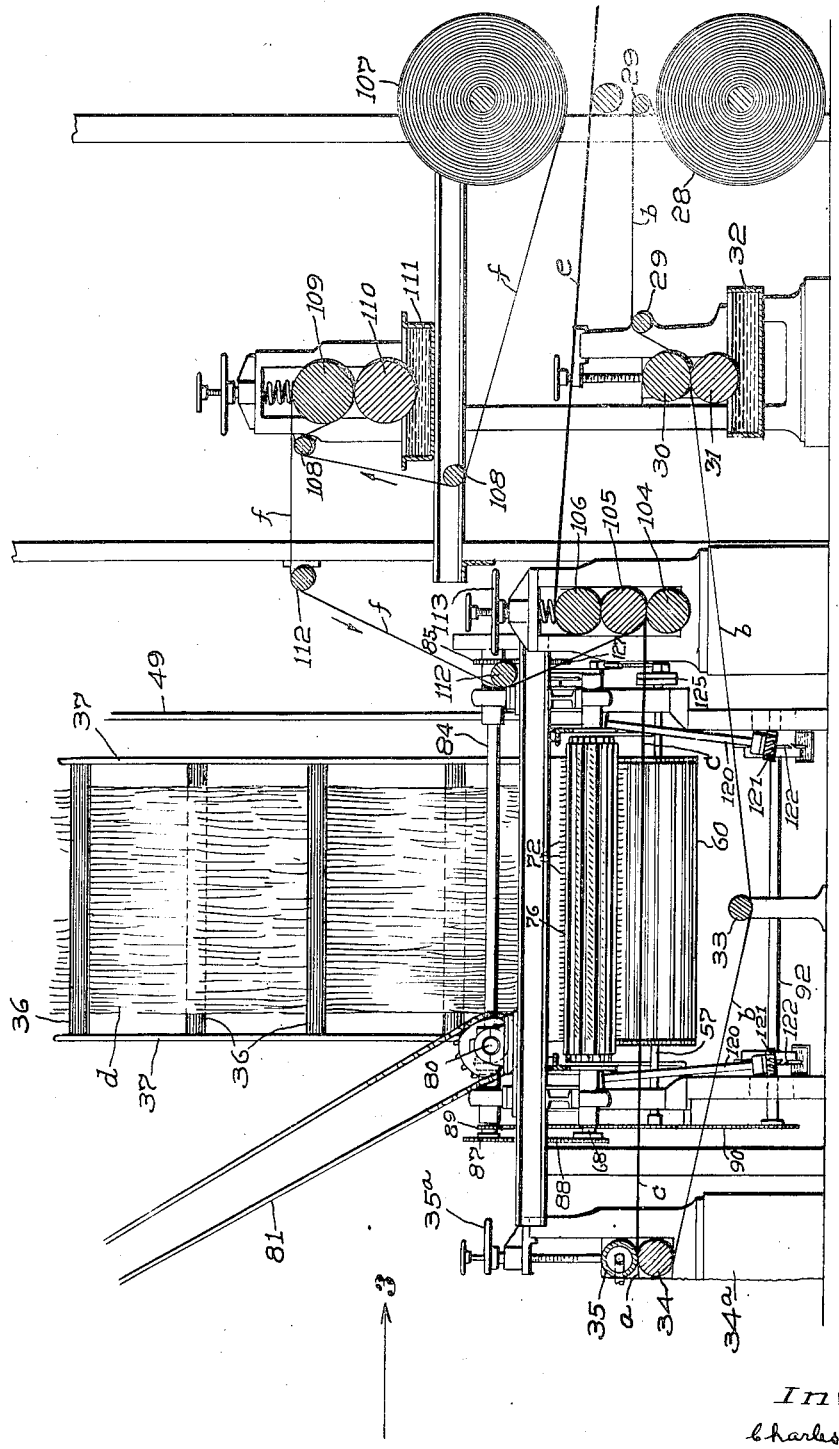
Fig. 2 is a side view with parts in section of a continuation of the machine shown in Fig. 1, and discloses mechanism for applying transverse reenforcing filaments to a fabric.
Figure 3:
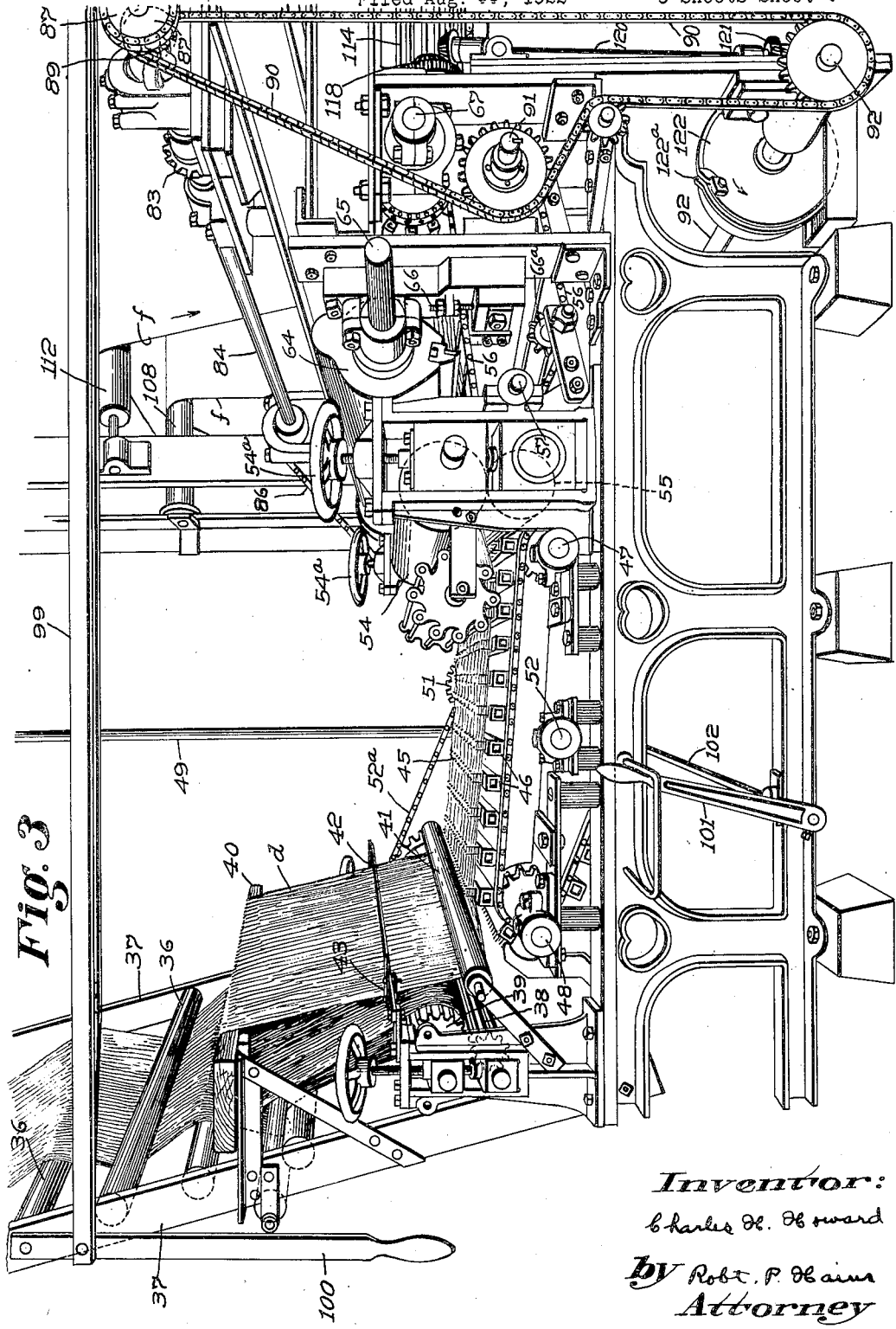
Fig. 3 is a perspective view looking in the direction of the arrow 3 of Fig. 2, of the portion of the machine that handles the transverse reenforcing filaments.

In the embodiment of the invention disclosed in the drawings, the mechanism of Fig. 1 is adapted to deliver reenforcing filament in the form of a thin sheet to a sheet of paper or fabric to reinforce the same longitudinally, and in Figs. 2 and 3 a somewhat similar mechanism is shown for feeding a relatively thin sheet of reenforcing filaments toward the paper or fabric to be reinforced in a direction transversely to the same that these filaments may be applied transversely of the paper or fabric.

The mechanism disclosed in Fig. 1 may consist of a supporting frame 10 which may be of sufficient width to accommodate the width of the sheet of filaments that are to be applied longitudinally to the paper or fabric. The filaments a preferably are advanced toward the machine shown in Fig. 1 in the form of rovings disposed side by side, and in the present case these rovings may be drawn from a suitable source of supply upon the floor 11 above the floor of the building which supports the present machine. The rovings preferably pass downward about guide bars 12 supported by upwardly extending beams 13 and the sheet of rovings a may pass over one side of one guide bar 12 and over the opposite side of the next guide bar in a zig-zag manner, as will be apparent from the drawing.

Near the left hand end of the machine shown in Fig. 1 are provided a pair of crimping rolls 14 and 15 between which the sheet of rovings *a* passes and these crimping rolls grip this sheet and pull the rovings forward from the source of supply. Some distance above the crimping rolls just mentioned is supported a board 16 over which the sheet *a* is passed after the same leaves the crimping rolls. This board serves to remove the crimp placed in the filaments or fibres of the sheet *a* by the rolls 14 and 15, and it serves also to provide a sufficient length of the sheet *a* between the crimping rolls and the attenuating means, to be described, to permit the fibres of the sheet *a* to be drawn out by the attenuating means. It will be apparent that the fibres cannot be drawn out in a thin sheet until the rear ends of the fibres being drawn have passed out of engagements with the crimping rolls 14 and 15. The gripping engagement of the rolls 14 and 15 may be varied by operating the hand wheels 17 to move one of these rolls toward or from the other.

In the construction shown an endless carrier 18 is supported by the frame 10 which has a series of combs 19 provided with teeth that pass between the fibres of the sheet *a*. The endless carrier 18 may pass around suitable sprockets mounted on the shafts 20 and 21 respectively, and movement may be imparted to the endless carriers by the vertical shaft 22 having a worm 23 at its lower end which meshes with a gear 24 secured to the shaft 21. The crimping rolls 14 and 15 in the present case are driven from shaft 21 by a chain 25 that passes around a sprocket wheel 26 operatively secured to the lower crimping roll 14. The arrangement is such that the teeth of the combs 19 are advanced at a speed considerably in excess of the speed at which the sheet of fibres *a* is fed forward by the crimping rolls, and as a result the combs 19 are drawn through the fibres of the sheet with a combing and attenuating effect. A guide roll 27 is supported adjacent the material receiving end of the upper run of the endless carriers 18 and serves to force the sheet of fibres *a* into engagement with the teeth of the combs 19. The fibres or filaments *a* leave the endless carrier 18 in the form of a thin sheet having the fibres disposed in substantially parallel relation and in condition to be applied longitudinally of the paper or fabric that is to be reinforced.

The paper to be reinforced may be drawn from a supply roll 28, see Fig. 2, and may pass around guide rolls 29 and between a pair of rolls 30 and 31 the lower of which rotates in a pan of asphaltum 32 or other adhesive material and serves to apply the asphaltum or other adhesive to the lower surface of the sheet of paper *b*. This sheet of paper is then passed under a guide roll 33 and between a pair of squeeze rolls 34 and 35, supported by uprights 34$^a$, and the upper roll may be heated by steam supplied by the pipe 35$^b$ to keep the asphaltum in a soft pliable condition, and one roll may be adjusted relative to the other by hand wheels 35$^a$. The sheet of fibres *a* may be applied to the adhesive surface of the paper *b* at the point where the paper passes between the rolls 34 and 35, and these rolls are rotated at a speed considerably in excess of the speed at which the sheet *a* is advanced so that as the filaments of the sheet *a* enter between the rolls 34 and 35 they will be engaged and pulled forward by these rolls further to attenuate the fibres or filaments of the sheet while at the same time they are forced into engagement with the adhesive face of the sheet *b*, and the sheet that emerges from the rolls 34 and 35 with reenforcing filaments applied longitudinally thereof is designated by *c*.

The mechanism so far described serves to apply reenforcing filament in an economically thin sheet longitudinally of the paper to be reinforced, and the mechanism for applying reenforcing filaments or fibres transversely of this sheet will now be described.

Referring more particularly to Figs. 2 and 3, a sheet of rovings *d* arranged in substantially parallel relation may be drawn forward from a suitable source of supply over the guide rolls 36 which may be supported by upwardly extending beams 37, and the sheet of rovings *d* is guided by the bars 36 toward a pair of crimping rolls 38 and 39 that may be similar in construction and operation to the crimping rolls 14 and 15 above mentioned. After the sheet *d* has passed between the crimping rolls 38 and 39 it preferably is passed upwardly over a board 40 similar to the board 16 above mentioned and is then passed downwardly under a roller 41 which serves to force the filaments or fibres of the sheet *d* into engagement with the teeth of traveling combs to be described.

A width gage 42 preferably is supported adjacent the path of travel of the sheet *d* and between the board 40 and roller 41 and has adjustable guide numbers 43 which serve to control the width of the sheet *d*, and the sheet *a* shown in Fig. 1 preferably has a similar width gage 44.

An endless carrier 45 similar in construction and operation to the carrier 18 above described is supported to receive the sheet *d* from the crimping rolls, and has combs 46 provided with teeth that serve to comb out and attenuate the fibres of the sheet *d*. The endless carrier 45 preferably is supported and operated by sprocket wheels mounted upon the shafts 47 and 48 respectively. In the present case movement is imparted to the endless carrier 45 by a vertical shaft 49 provided at its lower end with a worm 50

(see Fig. 5) that meshes with a gear wheel 51 secured to a shaft 52 and this shaft is provided with a chain 53 which drives the shaft 47, and the latter imparts the desired travel to the endless carrier 45. The crimping rolls 38 and 39 are driven from the shaft 52 by chain 52ª.

The endless carrier 45 preferably is operated at a speed considerably in excess of the speed at which the sheet $d$ is advanced by the gripping rolls 38 and 39, and adjacent the delivery end of the upper run of the endless carrier 45 are provided drawing rolls 54 and 55 which grip the fibres of the sheet $d$ as they leave the combs 46, and these rolls are operated at a speed in excess of the speed at which the combs just mentioned travel so that the fibres are further attenuated as they are drawn forward through the teeth of the combs by the rolls 54 and 55. One of these rolls may be adjusted toward or from the other by operating the hand wheels 54ª.

The sheet $d$ is carried from the gripping rolls just mentioned by an endless conveyor 56; to a position in which the fibres of this sheet are to be applied transversely of the sheet of paper $c$. This endless conveyor is supported by sprockets mounted on the space shafts 57 and 58 respectively, (see Fig. 6) and the conveyor 56 preferably consists of sprocket chains 59 at each side thereof and having bars 60 extending transversely from one side chain 59 to the other, and the bars 60 serve to support the sheet of attenuated fibres $d$ as they leave the rolls 54 and 55, and to advance the same toward the lower run of an endless carrier 61.

In the present invention the transversely reenforcing fibres or filaments are cut to a length that approximately corresponds to the width of the paper to be reinforced, and to this end severing means is provided which will now be described.

In the construction shown the sheet of fibres $d$ is severed while being advanced by the endless conveyor 56, and as best shown in Fig. 6, a fixed bar 62 is provided which is supported slightly below the path in which the bars 60 travel by a beam 62ª, and a cutter 63 is secured to a drum or the like 64 which is rotatively mounted upon the shaft 65, and the drum 64 is rotated at such a speed that it will make a complete rotation while a desired length of the sheet of fibres $d$ is passed over the bar 62, and the fibres will be cut to the desired length each time the knife 63 makes a complete rotation and cuts against the bar 62. Adjusting bolts 66 adjacent each end of the bar 62ª serve to adjust this bar toward or from the cutter with which it cooperates, and the lower run of the conveyor 56 may be held away from the bar 62ª by sprockets 66ª.

Figure 9:
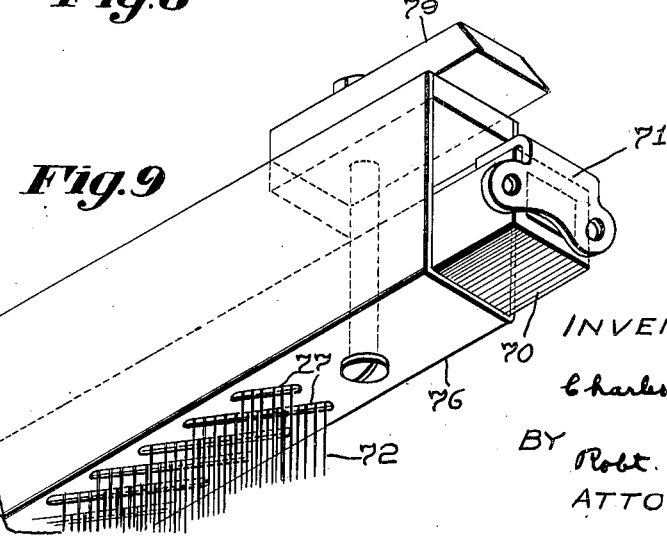
Fig. 9 is a perspective view of a portion of a comb and cooperating doffing bar.

The endless carrier 61 travels about the shafts 67 and 68 and is provided with sprocket chains 69 at each side thereof and to which transversely extending bars or combs 70 are secured, and the lower run of the chains 69 may be supported by guide rails 69ª. In the present case as will be apparent from Fig. 9 the opposite ends of each bar or comb 70 have a specially constructed link 71 secured thereto, and these links form a part of the sprocket chain 69. Each bar or comb 70 is provided with a number of teeth 72 extending outwardly from a face thereof. These teeth serve to engage the transversely reenforcing filaments which have been severed and to carry them to a position above the paper $c$ that is to be reinforced, and as will be apparent from Fig. 6 the upper run of the endless conveyor 56 is inclined upwardly slightly toward the lower run of the endless carrier 61, the arrangement being such that as the filaments approach an end of the upper run of the conveyor they are moved into engagement with the teeth 72 of the carrier. The transversely extending bars 60 not only support and advance the sheet $d$ of filaments, but serve also to force these filaments upwardly between the teeth 72, and in order to increase the number of bars along the portion of the upper run of the conveyor that is adjacent the comb, a secondary endless conveyor 73 is provided which is supported by sprockets carried by the shaft 58 and a shaft 74, and this second conveyor is provided with transversely extending bars 75 similar to the bars 60, and one of the bars 75 is introduced between each pair of space bars 60, as will be apparent from Fig. 6, so that the bars 60 and 75 support the sheet of filaments at each side of the teeth of a comb that is being forced between these filaments. As a result of this construction the teeth of the combs 70 of the lower run of the carrier 61 are forced between the filaments which have been cut to the desired length and the filaments are supported by these teeth until they are moved to a position above the paper $c$ that is to be reinforced, whereupon the filaments are forced out of engagement with the teeth by doffing means to be described, and fall upon the paper. As a result of this construction the filaments of the sheet $d$ are not brought into engagement with the combs 70 until the latter have completed their travel from the upper to the lower run of the endless carrier, and the bars 60 of the endless conveyor are spaced a sufficient distance apart to prevent the cutter 63 from contacting therewith when its speed of rotation is varied as hereinafter described.

In the construction of the doffing means shown, each comb or bar 70 is provided with a metal strip 76 having perforations 77 formed therein through which the teeth 72 may project, and the metal strips 76 are normally supported so that the teeth 72 extend through the perforations 77 and when it is desirable to disengage the filaments from the teeth 72 this is accomplished by relative movement of the bar 70 and strip 76 which withdraws the teeth from the perforations 77. In the present case the metal strips 76 are given a box like construction which enclose combs 70 as will be apparent from Fig. 9, and these boxes are mounted to slide upon the combs 70 in a lateral direction, that is in a direction to insert the teeth of the comb through the perforations 77 and to withdraw the teeth therefrom. The boxes just mentioned that embrace the combs 70 slide freely upon the combs and as a result the boxes traveling along the upper run of the conveyor 61 will assume the position shown in Fig. 6 in which they are out of doffing position, but as these boxes travel from the upper to the lower run, the weight of the boxes will tend to move them downwardly into doffing position. This is prevented however by inclined guide bars 78 supported in a fixed position at each side of the lower run of the carrier and adjacent the left hand end of this lower run viewing Fig. 6. The boxes just mentioned are provided with projection 79 at the ends thereof which engage the inclined bars 78 and are held thereby out of the doffing position, and guide ways which will be hereinafter more fully described cooperate with the bars 78 to hold the doffing bars 76 in the inoperative position until the sheet of filaments is moved to the desired position above the strip of paper c, whereupon a number of the doffing bars 76 are moved simultaneously to the doffing position to deposit the sheet of filaments upon the paper to be reinforced.

It is important that all the operating elements of the entire machine be driven in timed relation, and the means for driving the conveyor 56 and associated mechanism will now be described.

Referring to Fig. 4 a horizontally extending shaft 80 is provided which is driven by a sprocket chain 81 from a source of power (not shown). At one end of this shaft is provided a beveled gear 82 which meshes with a beveled gear 83 secured to a shaft 84 extending across the machine shown in Fig. 3. At one end of the shaft 84 is provided a sprocket wheel 85 (see Fig. 5) which through a sprocket chain 86 operates the shaft 65 to which the cutter supporting means 64 is secured. At the opposite end of the shaft 84 is provided a sprocket 87 about which a chain 88 passes and this chain drives the shaft 68 upon which the sprockets are mounted which operate the endless carrier 61. Upon the shaft 84 and adjacent the sprocket 87 is provided a second sprocket 89 that operates a chain 90 as will be apparent from Fig. 3, and this chain drives a shaft 91 and a second shaft 92. The object of each of which will be hereinafter described.

As just stated the endless carrier 61 is driven by the chain 88, as shown in Fig. 4, and this carrier rotates the shaft 67 at the left hand end thereof as will be apparent from Fig. 6, and rotation of the shaft 67 is utilized to drive the endless conveyor 56. This is accomplished by a series of meshing gears 93, 94, 95 and 96 the latter of which drives the shaft 58 and this shaft imparts the desired movement to the endless conveyor 56, and also to the auxiliary endless conveyor 73. The shaft 57 about which the endless conveyor 56 passes and which receives its rotating movement from said conveyor has a sprocket chain at one end thereof as shown in Fig. 5, and a chain 97 engaging this sprocket wheel serves to drive roller 55 of the gripping rolls 54 and 55.

From the above description of the operating means, it will be seen that the gripping rolls 54 and 55 and all mechanism so far described lying to the right hand side of these rolls in Fig. 3 is driven from the main shaft 80 which is operated by the chain 81, and that the mechanism lying to the left hand side of the gripping rolls 54 and 55 Fig. 3 is driven by the vertically extending shaft 49, while the mechanism shown in Fig. 1 is driven by the vertically extending shaft 22. The driving means 22, 49 and 81 should be operated from a common source of power in order to insure that the different parts of the present fabric reenforcing machine will be operated in timed relation.

The parts of the present machine which receive power from the shaft 80 (see Fig. 4) may be controlled by a starting clutch 98 which may be operated from a point near one end of the machine by a horizontally extending bar 99 that is connected to a hand operated lever 100 clearly shown in Fig. 3, and the mechanism driven by the vertical shaft 49 of Fig. 3 may be controlled from either side of the machine by handles 101 secured to a horizontal shaft 102 that operates the clutch mechanism shown in Fig. 15. This mechanism consists of a link 102ª that serves to raise and lower the shaft 49 to move the portion 103 of a clutch into and out of driving engagement with the worm 50 mounted loosely upon the shaft 49.

The strip of paper c upon leaving the rolls 34 and 35 shown to the left in Fig. 2 passes under the endless carrier 61 to receive the transverse reenforcing filaments, and then passes between the rolls 104 and 105 which serve to force the reenforcing filaments into intimate engagement with the adhesive covered face of the paper. The paper then passes part way around the roll 105 and then part way around a third roll 106 as clearly shown in Fig. 2, and then passes from the upper portion of the roll 106 as the finished product which is designated by e.

A second sheet of paper designated by f preferably is applied to the first sheet to enclose the filaments between the two sheets of paper, and this is conveniently done by drawing the sheet of paper f from a source of supply 107 and then about guide rolls 108 to a pair of rolls 109 and 110 so that the paper will pass between the rolls 109 and 110 and will have asphaltum or other adhesive applied to one face thereof by the roll 110 which rotates in a pan 111 containing the desired adhesive. As the strip of paper f leaves the rolls 109 and 110 it passes over the guide rolls 112 and then passes between the rolls 105 and 104 at which point its adhesive covered face is pressed into engagement with the filaments that have been applied to the sheet of paper c, and then the rolls 105 and 106 about which the composite sheet passes serve to force the two sheets into close engagement with the filaments therebetween, and the pressure which these rolls exert upon the paper may be controlled by adjusting the hand wheels 113.

As stated the doffing bars 76 are operated to move the transversely reenforcing filaments out of engagement with the supporting teeth 72 to deposit these filaments upon the strip of paper c passing below, and the mechanism for operating the doffing bars will now be described. The guide bars 78 shown in Figs. 6 and 10 serve to engage the projections 79 at each end of the doffing bars to hold these bars in their inoperative position as they start their travel along the lower run of the endless conveyor 61, and these guide bars direct the projections 79 onto alined slide-ways to be described.

Figure 8:
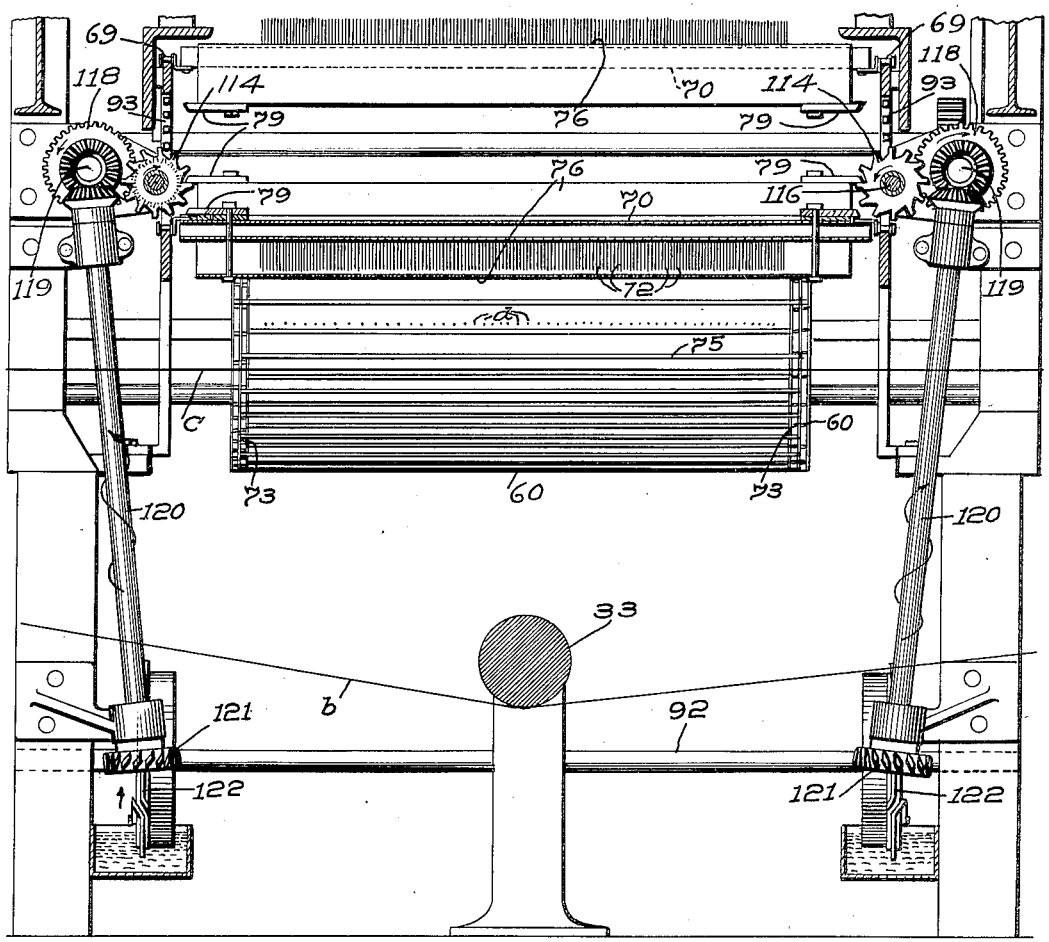
Fig. 8 is a vertical sectional view taken on line 8—8 of Fig. 7.

It is desirable that means be provided for supporting a number of the doffing bars 76 in their inoperative position until the transversely reenforcing filaments carried by the combs 70 have been advanced by the teeth 72 to the desired position above the paper c to be reinforced, whereupon the doffing bars 76 should be doffed simultaneously. Various means may be provided to this end, and in the present case relatively long rotative members 114 that resemble gears in appearance are mounted at each side of the lower run of the carrier 61, and each of the members 114 has a number of teeth 115 extending longitudinally thereof that form slide-ways upon which the projections 79 of the doffing bars may rest, and the members 114 are so positioned with respect to the guide bars 78 that any tooth 115 may be brought into alinement with a guide bar 78 to support the doffing bars 76 in the inoperative position as they travel along the lower run of the carrier. The rotating members 114 are mounted upon shafts 116 (see Figs. 8 and 10) which are operated by gears 117 and 118, and the gears 118 are mounted upon auxiliary shafts 119 which are geared to substantially vertical shafts 120, at the lower end of which are provided gears 121 which mesh with gears 122 secured to the horizontally extending shaft 92.

The gears 122 are so constructed that one complete rotation thereof will rotate the gears 121 through a space of one tooth. The construction is such that one complete rotation of the shaft 92 turns each of the rotary members 114 sufficient to move one tooth 115 out of alinement with the guide bars 78 and to bring the next tooth into alinement with these guide bars, and as a result of this operation all of the doffing bars that are supported by one of the slide-ways of each member 114 are lowered simultaneously, and the next tooth 115 of each member is moved into position to support other doffing bars 76 that are being advanced by the endless carrier along the guide bars 78. The gears 122 are so constructed that they hold the shafts 120 against rotation in either direction until the beveled portion 122ᵃ engages a tooth of the gear 121 and rotates this gear through a space of one tooth as will be apparent from Figs. 11 and 12. Rotation of the gears 121 through a distance of one tooth rotates the members 114 in the direction indicated by the arrows in Fig. 8 through a distance of one tooth, with the result that all the doffing bars that are supported by a slide-way of each of the members 114 are simultaneously lowered.

It is desirable that the present machine be constructed to apply reenforcing filaments to strips of paper of different width, and to accomplish this it is necessary to provide means whereby the length to which the transversely reenforcing filaments are cut may be increased or decreased to conform to the width of the strip of paper upon which they are to be applied, and it is also desirable that the means for controlling the operation of the doffing bars 76 be so constructed that the number of doffing bars operated simultaneously thereby may be increased or decreased in accordance with the width of paper to be reinforced.

To this end in the present case the elongated rotating members 114 consist of a main section and several short sections at one end of the main section as best shown in Fig. 10, and as indicated by 114ᵃ and 114ᵇ. These sections may be secured to the shaft 116 so that they will be rotated with the main sections or if desired one or more of the sections 114ᵃ, 114ᵇ may be secured in a fixed position so that they are prevented from rotating, and serve merely to increase the length of the guide ways 78. Accordingly the sections 114ᵃ and 114ᵇ may be secured to the shaft 116 by screws 123, or these screws may be removed so that the sections will be no longer rotated by the shaft 116, and an angle bar 124 (see Fig. 4.) may be engaged with the teeth of the sections 114ᵃ and 114ᵇ to secure the same against rotation and with a slide-way 115 held in alinement with the adjacent guide bar 78. As a result of this construction rotation of the members 114 will serve to doff all the doffing bars supported thereby, if the sections 114ᵃ and 114ᵇ are rotated, but if these sections are held against rotation only such doffing bars as are supported by the main portion of the members 114 will be doffed. Upon referring to Fig. 4 it will be seen that the width of the sheet of paper c to be reinforced is less than the length of the entire rotary member 114 and that the sections 114ᵃ and 114ᵇ are therefore held by the bracket 124 against rotation, and as a result the doffing bars 76 supported by the sections 114ᵃ and 114ᵇ when the main portion of the member 114 is rotated, will not be doffed.

It is important that the rotating cutter 63 shown in Fig. 6 be rotated in the direction in which the filaments d travel and also that this cutter be advanced at the same speed as the filaments while it engages the filaments in cutting the same, for if the cutter 63 moves at a different speed it will disturb the position of the filaments upon the endless conveyor 56. It is apparent that the cutter supporting drum 64 may be given a diameter that will advance the cutter at the same peripheral speed as the speed at which the filaments d are advanced, but should it be desired to change the operation of the machine so that it will cut filament for a sheet of paper having a greater or less width than the width for which the drum 64 was designed, it will then be necessary to operate the drum at either a greater or less peripheral speed than that at which the filaments d are advanced. In other words, if the machine of the present invention is provided with a drum 64 that rotates at a peripheral speed that corresponds to the speed at which the filaments d are advanced in reenforcing a paper sheet c the width of which say is four feet and it is desired to reinforce paper of different width, say three feet, the drum 64 will need to be rotated at a higher speed to cut the filaments into three feet length than into four feet length, but this higher speed will cause the knife 63 to advance at a speed other than the speed of the filaments d.

This difficulty is overcome in accordance with the present invention by providing adjustable means whereby the peripheral speed of the knife 63 may be either increased or decreased momentarily to correspond to the speed of travel of the filament d.

To this end, in the construction shown the chain 86 (see Fig. 5) does not drive the shaft 65 directly but operates this shaft through the intermediate gears within the housing 125. This housing has journaled therein a stub shaft 126, (see Fig. 14) in the present case comprising a sleeve that is rotatably mounted on a reduced end of the shaft 65. The stub shaft has a sprocket 127 keyed thereto and which is driven by the chain 86. Within the housing 125 a gear 128 is keyed to the shaft 126, and the gear 128 drives pinions 129 that operate an internally toothed gear 130 that is rigidly secured to a head 131 which in turn is keyed to the shaft 65. The pinions 129 are journaled on stub shaft 132 carried by a disk 133, and this disk is journaled upon the stub shaft 126 for rocking movement. The arrangement is such that as long as the disk 133 is held in a fixed position, rotation of the stub shaft 126 will rotate the shaft 65 at a rate of speed having a definite relation to the speed of the stub shaft, but if the disk 133 which carries the pinions 129 is rocked back and forth while the shaft 65 is being driven, the speed of this shaft will be increased during the interval of time that the disk 133 is rocked in one direction and will be decreased during the interval of time that the disk is rocked in the opposite direction. In the construction shown two interengaging pinions 129 are provided so as to rotate the outer gear 130 in the same direction as the gear 128, as indicated by the arrows in Fig. 13.

Oscillatory movement may be imparted to the disk 133 by a crank shaft 134 having one end secured to a projection thereupon as at 135, and the other end of the crank shaft is adjustably secured to a slotted head 136 by a bolt 137. The arrangement is such that the amount of rocking movement imparted to the disk 133 may be varied by adjusting the bolt 137 toward or from the axis of the head 136, and the length of the crank shaft 134 preferably is adjustable as shown. The head 136 is mounted upon and is driven by shaft 91 shown at the right hand side of Fig. 3.

From the foregoing description when read in connection with the drawings it will be seen that the mechanism of Fig. 1 serves to attenuate a sheet of filaments or fibres a and to advance this sheet toward the rolls 34 and 35 (see Figs. 2 and 16), at which point this sheet of filaments is applied longitudinally of the traveling sheet of paper *b*. It will also be seen that similar mechanism disposed at right angles to the first mechanism serves to attenuate a second sheet of filaments or fibres *d*, and to advance this second sheet toward the longitudinally reinforced sheet *c* (see Fig. 16); also that mechanism is provided for cutting the sheet *d* into lengths or sections corresponding to the width of the sheet of paper *c*, and for applying these sections transversely of the sheet *c*, and that mechanism is provided which may be adjusted to doff transverse reenforcing filaments of different lengths.

What is claimed is:

1. A machine of the character described, comprising, in combination, means for feeding a fabric to be reinforced by filaments, means for feeding a sheet of filaments transversely to the path of the fabric, an endless carrier having comb teeth to project between the filaments of said sheet and hold the same, means for advancing the sheet of filaments toward a run of the endless carrier so that the teeth of the carrier passing from one run to the other will not engage the filaments until after they have completed their travel from one run to the other and have moved a short distance along said run and means for applying the sheet of filaments engaged by the comb teeth transversely of the fabric.

2. A machine of the character described, comprising, in combination, means for feeding a fabric to be reinforced by filaments, means for feeding a sheet of filaments transversely to the path of the fabric, an endless carrier having comb teeth thereon to project between the filaments of said sheet and frictionally hold the same, means for advancing the sheet of filaments along an upwardly inclined path toward the lower run of the endless carrier so that the teeth that are traveling from the upper to the lower run will not engage the filaments until the teeth have completely reached the lower run, and means for applying the sheet of filaments engaged by the comb teeth transversely of the fabric.

3. In a machine of the character described, the combination of an endless carrier having comb teeth thereon, means for directing a sheet of filaments toward the lower run of the endless carrier to project the teeth of the carrier between the filaments and hold the same, and means for doffing the filaments from the teeth as the sheet of filaments is advanced to a predetermined position, comprising apertured plates through which the teeth extend, and means for effecting relative movement of the plate and teeth to withdraw one from the other.

4. In a machine of the character described, the combination of an endless carrier having transversely extending bars with teeth extending therefrom, means for directing a sheet formed of substantially parallel filaments toward the lower run of the endless carrier to project the teeth of the carrier between the filaments and frictionally hold the same, and means for doffing the filaments from the teeth as the sheet of filaments is advanced to a predetermined position, comprising boxes embracing said bars and having apertures in a wall thereof through which the teeth extend, and means for effecting relative movement of the bars and boxes to force the filaments out of engagement with the teeth.

5. In a machine of the character described, the combination of an endless carrier having comb teeth thereon, means for directing a sheet of substantially parallel filaments toward the lower run of the carrier to project the teeth of the carrier between the filaments and frictionally hold the same, doffing bars for disengaging the filaments from the teeth as the sheet of filaments is advanced to a predetermined position, a slide-way for supporting the doffing bars raised, and means for actuating the slide-way to lower the doffing bars into the doffing position.

6. In a machine of the character described, the combination of an endless carrier having comb teeth thereon, means for supporting a sheet of substantially parallel filaments in position to have the teeth of the lower run of the carrier projected between the filaments to hold the same, doffing bars for disengaging the filaments from the teeth as the sheet of filaments is advanced to a predetermined position, slide-ways having the ends of the doffing bars resting thereon to support the bars in the inactive position, and means for lowering the slideways to lower the doffing bars into the doffing position.

7. In a machine of the character described, the combination of an endless carrier having comb teeth thereon, means for supporting a sheet of substantially parallel filaments in position to have the teeth of the carrier projected between the filaments to hold the same, doffing bars for disengaging the filaments from the teeth of the carrier, rotatable members having grooves extending longitudinally thereof and forming slide-ways that support the doffing bars, and means for rotating said members to move the doffing bars from the inactive to the doffing position.

8. In a machine of the character described, the combination of an endless carrier having comb teeth thereon, means for supporting a sheet of substantially parallel filaments in position to have the teeth of the carrier projected between the filaments to hold the same, doffing bars for disengaging the filaments from the teeth of the carrier, rotatable members having teeth extending longitudinally thereof and adapted to form slide-ways that support the doffing bars, and means for rotating said members through an arc sufficient to move one group of bars into doffing position and to position other teeth to support the next group of bars.

9. In a machine for reenforcing a fabric, means for feeding a fabric to be reinforced, means for feeding a sheet of filaments transversely to the path of feed of the fabric, an endless carrier having comb teeth thereon, means for projecting the teeth of the carrier between the filaments to hold them, doffing bars for disengaging the filaments from the teeth of the carrier to deposit the sheet of filament transversely of said fabric, slide-ways for supporting the doffing bars in the inoperative position, and means for actuating the slide-ways to move the doffing bars to doffing position.

10. In a machine for reenforcing a fabric, means for feeding a fabric to be reinforced, means for feed a sheet of filaments transversely to the path of feed of the fabric, an endless carrier having comb teeth thereon, means for projecting the teeth of the carrier between the filaments to hold them, doffing bars for disengaging the filaments from the teeth of the carrier to deposit the sheet of filament transversely of said fabric, rotatable members having teeth extending longitudinally thereof and forming slide-ways that support the doffing bars, and means for rotating said members to move the group of bars supported thereby into doffing position and to bring other teeth into position to support another group of bars.

11. In a machine of the character described, the combination of an endless carrier having comb teeth thereon, means for supporting a sheet of substantially parallel filaments in position to have the teeth of the carrier projected between the filaments to hold the same, doffing bars for disengaging the filaments from the teeth of the carrier, slide ways for controlling the operation of the doffing bars, and means for varying the active length of said slide-ways.

12. In a machine of the character described, the combination of an endless carrier having comb teeth, means for supporting a sheet of substantially parallel filaments in position to have the teeth of the carrier projected between the filaments to hold the same, doffing bars for disengaging the filaments from the teeth of the carrier, rotatable members having teeth extending longitudinally thereof and forming slide-ways that control the operation of the doffing bars, and means for holding an end portion of the rotatable members inactive thereby to vary the number of doffing bars moved to doffing position.

13. In a machine of the character described, the combination of an endless carrier having comb teeth, means for supporting a sheet of substantially parallel filaments in position to have the teeth of the carrier projected between the filaments to hold the same, doffing bars for disengaging the filaments from the teeth of the carrier, slide-ways formed in sections and adapted to control the actuation of the doffing bars, means for actuating the slide-ways to move the doffing bars to doffing position, and means for rendering one or more of the slide-way sections inoperative thereby to vary the number of doffing bars moved to doffing position.

14. A machine of the character described, comprising, in combination, means for feeding a fabric to be reinforced, means for feeding reenforcing filaments transversely to the path of feed of the fabric, means to sever the sheet of filaments to form sections, means adjustable to vary the operation of the severing means to accommodate fabrics of different width, and means for applying the filaments of said sections transversely of the fabric.

15. A machine of the character described, comprising, in combination, means for feeding a fabric to be reinforced, means progressively to feed sheet sections of loose filaments in a path transverse to the direction of feed of the fabric, and means for applying the filaments of said sections transversely of the fabric, said last mentioned means having provision for varying the actuation of the applying means in accordance with the width of the fabric to be reinforced.

16. A machine of the character described, comprising, in combination, means for feeding a fabric to be reinforced, a carrier progressively to feed sheet sections of loose filaments in a path transverse to the direction of feed of the fabric, means for transferring the sections of filaments from the carriers to the fabric, and means for varying the actuation of the transferring means to accommodate fabrics of different widths.

17. In a machine of the character described, in combination, means for feeding a fabric to be reinforced, means for feeding reenforcing filaments transversely to the path of feed of the fabric, a rotating cutter for severing the sheet of filaments to form sections, means for momentarily varying the speed of rotation of the cutter doing the cutting operation, and means for applying the filaments of said sections transversely of the fabric.

18. A machine of the character described, comprising, in combination, means for feeding a fabric to be reinforced by filaments, means for feeding a sheet of filaments transversely to the fabric, carriers for holding the filaments suspended and for moving the filaments to a position above and in spaced relation to the fabric, doffing means cooperating with the carriers for depositing the filaments transversely across the fabric, and means for positively moving the doffing means to and from the doffing position.

19. In a machine for reenforcing fabric, in combination, means for feeding a fabric to be reinforced, means for feeding a sheet of unspun reenforcing fibres transversely to the path of feed of the fabric, a rotating cutter for severing the sheet of fibres into sections, means adjustable for momentarily varying the speed at which the cutter is rotated to cause its speed to conform during the cutting operation to the speed at which the fibres are advanced, and means for applying the sections of fibres transversely of the fabric.

20. In a machine for reenforcing fabric, in combination, means for feeding a fabric to be reinforced, means for feeding a sheet of reenforcing filaments transversely to the path of the feed of the fabric, a rotating cutter for severing the sheet of filaments into sections, means adjustable for momentarily varying the speed at which the cutter is rotated to cause its speed to conform during the cutting operation to the speed at which the filaments are advanced, including a rotating head and a crank shaft adjustably secured to the head for variable crank throw, and means for applying the sections of filaments transversely of the fabric.

21. A machine of the character described, comprising in combination, means for feeding a fabric to be reinforced by unspun fibres, means for feeding a sheet of unspun substantially parallel fibres transversely to the fabric, carriers for carrying the fibres across the sheet, doffing means cooperating with the carriers for placing the fibres upon the fabric transversely thereof, and means for positively moving the doffing means to and from the doffing position.

22. In a machine of the character described, in combination, means for advancing a sheet of filaments toward a fabric to be reinforced, a rotating cutter for severing the sheet of filaments into sections of a predetermined length, an oscillating member interposed between driving elements for said cutter and operable to momentarily vary the speed of rotation of said cutter, and means for applying the sections of filaments transversely of the fabric.

23. In a machine of the character described, the combination of an endless carrier having comb teeth, a conveyor having transverse bars for supporting a sheet of filaments and advancing the filaments into position to be engaged by said comb, and an auxiliary conveyor having transverse bars engageable with said filament and adapted to assist the first mentioned bars to support the filament while the comb teeth are forced into engagement with the filaments.

24. In a machine of the character described, the combination of a series of traveling combs having projecting teeth, means for supporting a sheet of filaments in position to have the teeth of the combs projected between the filaments to hold and advance the same, doffing bars for disengaging the filaments from said teeth, rotating means for supporting the doffing bars in the inoperative position, and means for turning the supporting means to move the bars to the doffing position.

25. In a machine of the character described, the combination of a series of traveling combs having projecting teeth, means for supporting a sheet of filaments in position to have the teeth of the combs projected between the filaments to hold and advance the same, doffing bars for disengaging the filaments from said teeth, slide-ways for supporting the doffing bars in the inoperative position, and means for actuating the slide-ways to move the bars to the doffing position.

26. A machine for reenforcing paper, comprising in combination, means for feeding a fabric to be reinforced by unspun fibres, means for advancing a sheet of fibres from a source of supply, attenuating means for drawing out the fibres of the sheet, a bar interposed between the advancing means and attenuating means to increase the length of the path over which the fibres travel sufficiently to cause the trailing ends of the fibres to be released by said advancing means before the leading ends of the fibres are acted upon by the attenuating means, and means for feeding the sheet of fibres transversely of the sheet of paper and for applying the fibres across the paper sheet.

In testimony whereof, I have signed my name to this specification.

CHARLES H. HOWARD.